US011544716B2

(12) United States Patent
Martinez-Guarneros et al.

(10) Patent No.: US 11,544,716 B2
(45) Date of Patent: Jan. 3, 2023

(54) SYSTEMS AND METHODS FOR PROCESSING TRANSACTION DISPUTES AND PROCESSING TRANSACTIONS ASSOCIATED WITH COMPROMISED ACCOUNTS

(71) Applicant: Fidelity Information Services, LLC, Jacksonville, FL (US)

(72) Inventors: Luis Martinez-Guarneros, Wauwatosa, WI (US); Marc-Edwin Sebastian Rigaud, Lakeland, FL (US); Brian R. Bezanson, Hartford, WI (US); William A. Rickard, St. Petersburg, FL (US); Timothy Bryan Innes, Novato, CA (US); Tim Allen Priebe, Milwaukee, WI (US); Eric Vincent Little, Maitland, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 16/899,171

(22) Filed: Jun. 11, 2020

(65) Prior Publication Data
US 2021/0390545 A1    Dec. 16, 2021

(51) Int. Cl.
*G06Q 20/40* (2012.01)
*G06Q 40/02* (2012.01)
*G06N 20/00* (2019.01)

(52) U.S. Cl.
CPC .......... *G06Q 20/407* (2013.01); *G06N 20/00* (2019.01); *G06Q 40/02* (2013.01)

(58) Field of Classification Search
CPC .............................. G06Q 40/02; G06Q 20/407

USPC ........................................................ 705/44
See application file for complete search history.

(56) References Cited

U.S. PATENT DOCUMENTS

| 2009/0327134 | A1* | 12/2009 | Carlson .............. | G06Q 20/3223 705/44 |
| 2010/0312700 | A1* | 12/2010 | Coulter ................ | G06Q 20/108 705/42 |
| 2014/0214669 | A1* | 7/2014 | Holenstein ......... | G06Q 20/4016 705/44 |
| 2015/0186888 | A1* | 7/2015 | Katz ...................... | G06Q 40/12 705/39 |

\* cited by examiner

*Primary Examiner* — Lindsay M Maguire
(74) *Attorney, Agent, or Firm* — Finnegan, Henderson, Farabow, Garrett & Dunner, LLP

(57) ABSTRACT

The present disclosure provides systems and methods for computerized methods and systems for processing transaction disputes and processing transactions associated with compromised accounts. According to one exemplary method, a server receives, from a user device, an instruction for disputing a transaction associated with a user account. The server can initiate, based on a record of the transaction, a dispute investigation, and issue provisional credit to the user account for the transaction. Based on a transaction history associated with the user account, the server can determine a plurality of expected transactions associated with the user account and cause the determined expected transactions to be displayed on the user device. After receiving a transaction authorization for at least one of the plurality of expected transactions, the server can process payments for the at least one of the plurality of expected transactions, and generate a notification indicating a status of the dispute investigation.

22 Claims, 17 Drawing Sheets

```
Start
  ↓
Receive a dispute instruction for a transaction associated   — 501
with a user account
  ↓
Initiate a dispute investigation   — 503
  ↓
Issue provisional credit to the user account for the   — 505
transaction
  ↓
Determine a plurality of scheduled payments and expected   — 507
transactions associated with the user account
  ↓
Transaction authorized?   — 509
  ↓ Yes                                                    No →
Receive transaction authorization for at least one of the   — 511
plurality of scheduled payments and expected transactions
  ↓
Process payment for the at least one of the plurality of   — 513
scheduled payments and expected transactions
  ↓
Generate a notification message indicating an outcome of   — 515
the dispute investigation
  ↓
End
```

Dispute Concierge

Customer Servicing ‹

View Transactions

Review Open Disputes
Activate Card
Chat with Support

— 710

Profile

Hi, Jane Smith
Last Login:
October 31, 2018
11:05 AM EST

Change

65% Improve my profile

— 720

Help ⓘ  Close

Transactions

Checking

| Date | Payee | Amount | Transaction Number | Action |
|---|---|---|---|---|
| 2020-02-28 | Clothing Store | $57.29 | ABCDEF123456 | ⋮ |
| 2020-02-28 | Convenience Store | $400.00 | KMABCDEF123456 | ⋮ |
| 2020-02-24 | Movie Service | $14.95 | NFABCDEF123456 | ⋮ |
| 2020-02-22 | Cleaning Service | $129.97 | SABCDEF123456 | ⋮ |
| 2020-02-22 | Online Store | $299.97 | ANABCDEF123456 | ⋮ |
| 2020-02-21 | Gas Station, WI | $36.93 | BPGMKEFAB123456 | ⋮ |
| 2020-02-21 | Middle School | $35.00 | MSABCDEF123456 | ⋮ |

Dispute Concierge

👤 Customer Servicing ‹

View Transactions

Review Open Disputes

Activate Card

Chat with Support

800

↺   Help ⓘ   👥  Close

Profile

Hi, Jane Smith
Last Login:
October 31, 2018
11:05 AM EST

Change

65%  Improve my profile

Transactions

Checking

| Payee | Amount | Transaction Number | Action |
|---|---|---|---|
| Clothing Store | $57.29 | ABCDEF123456 | ⋮ |
| Convenience Store | $400.00 | KMABCDEF123456 | ⋯ Dispute Transaction — 810 |
| Movie Service | $14.95 | NFABCDEF123456 | ⋮ |
| Cleaning Service | $129.97 | SABCDEF123456 | ⋮ |
| Online Store | $299.97 | ANABCDEF123456 | ⋮ |
| Gas Station, WI | $36.93 | BPGMKEFAB123456 | ⋮ |
| Middle School | $35.00 | MSABCDEF123456 | |

Dispute Concierge

♣ Customer Servicing ‹

View Transactions

Review Open Disputes

Activate Card

Chat with Support

Profile

Hi, Jane Smith
Last Login:
October 31, 2018
11:05 AM EST

Change

65% Improve my profile

↻ Help ⓘ   ♣ Close

2. Please confirm the amount of the charge you are disputing. If the amount shown below is incorrect, please enter the correct amount.

● Full amount ($123.00)

○ Other amount

3. Is this transaction for service or merchandise?

○ Merchandise   ● Service

4. On what date was the service received?

2/25/2020

5. What was wrong with the service?

Didn't get what was advertised

Remaining 478 characters

Apply

6. What was the service you ordered?

Swedish Massage

Remaining 200 characters

Apply

Cancel   Submit Dispute

Dispute Concierge

- Customer Servicing ‹
- View Transactions
- Review Open Disputes
- Activate Card
- Chat with Support

1100

○ Help ⓘ  👤 Close

Profile

Hi, Jane Smith
Last Login:
October 31, 2018
11:05 AM EST

Change
65% Improve my profile

Flagged Transaction

Payee: Convenience Store    Date: 2020-02-28
Amount: $400.00              Reason: Fraud Hey Jane, we've got you covered.
We are sending you a new card, for now please verify your scheduled payments listed below.

| | Payee | Scheduled Payment Date | Amount |
|---|---|---|---|
| ✓ | The Reals | 2020-03-01 | $100.00 |
| ✓ | WebFlex | 2020-03-02 | $200.00 |
| ☐ | Shoe Store | 2020-03-03 | $5000.00 |
| ✓ | Wire Transfer | 2020-03-04 | $300.00 |

Submit

FIG. 11

Dispute Concierge

👤 Customer Servicing ‹

View Transactions
Review Open Disputes
Activate Card
Chat with Support

↻ Help ⓘ  👤 Close

Profile

Hi, Jane Smith
Last Login:
October 31, 2018
11:05 AM EST

Change

65% Improve my profile

Dispute Status

| | Status | Detail |
|---|---|---|
| 1 Flagged Transaction | Pending Research | Detail |

Card Status

| | Status | ETA |
|---|---|---|
| New Card | Shipped | 3 Days |

Thank You Jane!

We will make sure these payments go through. Those items with question mark will need your help. We will notify you if anything changes.

| Date | Payee | Status | Description |
|---|---|---|---|
| 2020-03-28 | Rent | ✓ | Updated Payment Account |
| 2020-03-24 | Movie Service | ✓ | Updated Payment Account |
| 2020-03-22 | TV Service | ! | Credit applied |
| 2020-03-21 | Middle School | ? | Details |

SYSTEMS AND METHODS FOR PROCESSING TRANSACTION DISPUTES AND PROCESSING TRANSACTIONS ASSOCIATED WITH COMPROMISED ACCOUNTS

TECHNICAL FIELD

The present disclosure generally relates to computerized methods and systems for processing financial transactions, and more particularly, to computerized methods and systems for processing transaction disputes and processing transactions associated with compromised accounts.

BACKGROUND

With a wide range of financial services, transactions between a financial service user and various entities (such as vendors, merchants, and other users) can occur anytime via various transaction platforms. Transfer of cash or cash-substitutes may be accomplished using negotiable instruments and/or electronic payment means including debit cards, credit cards, electronic fund transfers, etc. Each transaction may be subject to different procedures and protocols associated with a particular payee. Within one day, a user may be conducting a number of transactions with different entities via different payment networks, either in person or online. A user may further set up automatic payments for certain recurring transactions, allowing funds to be withdrawn from his or her account at a scheduled time.

Accompanying the increasing ease and convenience in conducting transactions, data breaches have become a rising threat to data security of financial service accounts. When a data breach occurs, an account number (e.g., a credit or debit card number) of a user (e.g., an individual or a corporation) may be compromised and exposed to third parties, subject to the risk of potential unauthorized transactions. Once a user becomes aware of the data breach or occurrence of unauthorized transactions (e.g., fraudulent charges or payments on his or her account), the user may report to a corresponding financial service provider by calling the customer service to dispute the unauthorized transactions. The financial service provider may protect the user's account by freezing the user account underlying the compromised account number, cancelling transactions under the compromised account number, and issuing a new account number to the user. The financial service provider may also initiate an investigation into the user-reported unauthorized transactions.

Such reporting and dispute resolution systems have at least the following problems. Initiation of transaction disputes are not real-time. A user needs to connect with an available representative of the financial service provider to report the unauthorized transactions. While the user attempts to connect with the representative to initiate the investigation and freeze the account, the compromised account is under continuing risk. Further, while the investigation is pending and a user awaits delivery of a new card, the user cannot process any payments using assets in the compromised account. The user may further need to revisit each previously scheduled or upcoming transaction, contact the corresponding payee to provide alternative payment information. In addition, when the user receives the new card, the user would have to update payment information for each future transaction, including those automatic payments linked to the previous account number. Delays in updating the payment information caused by the dispute resolution process may subject the user to various late charges or disruptions of services.

Given the above and other problems, there is a need for efficient and more user-friendly solutions for processing transaction disputes and processing transactions using compromised accounts.

SUMMARY

According to some embodiments of the present disclosure, computer-implemented transaction processing systems are provided. One exemplary system includes a non-transitory computer-readable medium configured to store instructions, and at least one processor configured to execute the instructions to perform transaction processing operations. The operations can include: receiving an instruction to dispute a transaction associated with a user account; initiating, based on a record of the transaction, a dispute investigation; and issuing provisional credit to the user account for the transaction. The operations can further include: determining a plurality of expected transactions associated with the user account; receiving a transaction authorization for at least one of the plurality of expected transactions; and processing, based on the transaction authorization, payments for the at least one of the plurality of expected transactions. In addition, the operations can further include generating a notification for display on the user device, the notification indicating a status of the dispute investigation.

According to some embodiments, computer-implemented methods for processing transactions are further provided. According to one exemplary method, a server receives, from a user device, an instruction for disputing a transaction associated with a user account. The server can then initiate, based on a record of the transaction, a dispute investigation, and issue provisional credit to the user account for the transaction. Based on a transaction history associated with the user account, the server can determine a plurality of expected transactions associated with the user account and cause the determined expected transactions to be displayed on the user device. After receiving a transaction authorization for at least one of the plurality of expected transactions, the server can process payments for the at least one of the plurality of expected transactions, and generate a notification for display on the user device, the notification indicating a status of the dispute investigation.

The foregoing general description and the following detailed description are exemplary and explanatory only and are not restrictive of the claims.

BRIEF DESCRIPTION OF THE DRAWINGS

FIG. 5 is a flow chart of an exemplary process for processing financial transactions, consistent with the disclosed embodiments.

FIG. 7 is a diagrammatic representation of an exemplary user interface displaying a transaction history, consistent with the disclosed embodiments.

FIG. 8 is a diagrammatic representation of an exemplary user interface displaying a user operation initiating a transaction dispute, consistent with the disclosed embodiments.

FIG. 9 is a diagrammatic representation of an exemplary user interface displaying exemplary reasons for a transaction dispute for user selection, consistent with the disclosed embodiments.

FIG. 10 is a diagrammatic representation of an exemplary user interface for collecting transaction information for a transaction dispute, consistent with the disclosed embodiments.

FIG. 11 is a diagrammatic representation of an exemplary user interface for processing scheduled payments, consistent with the disclosed embodiments.

FIG. 13 is a diagrammatic representation of another exemplary user interface for processing expected transactions, consistent with the disclosed embodiments.

FIG. 16 is a diagrammatic representation of another exemplary user interface for processing expected transactions, consistent with the disclosed embodiments.

DETAILED DESCRIPTION

Figure 1:
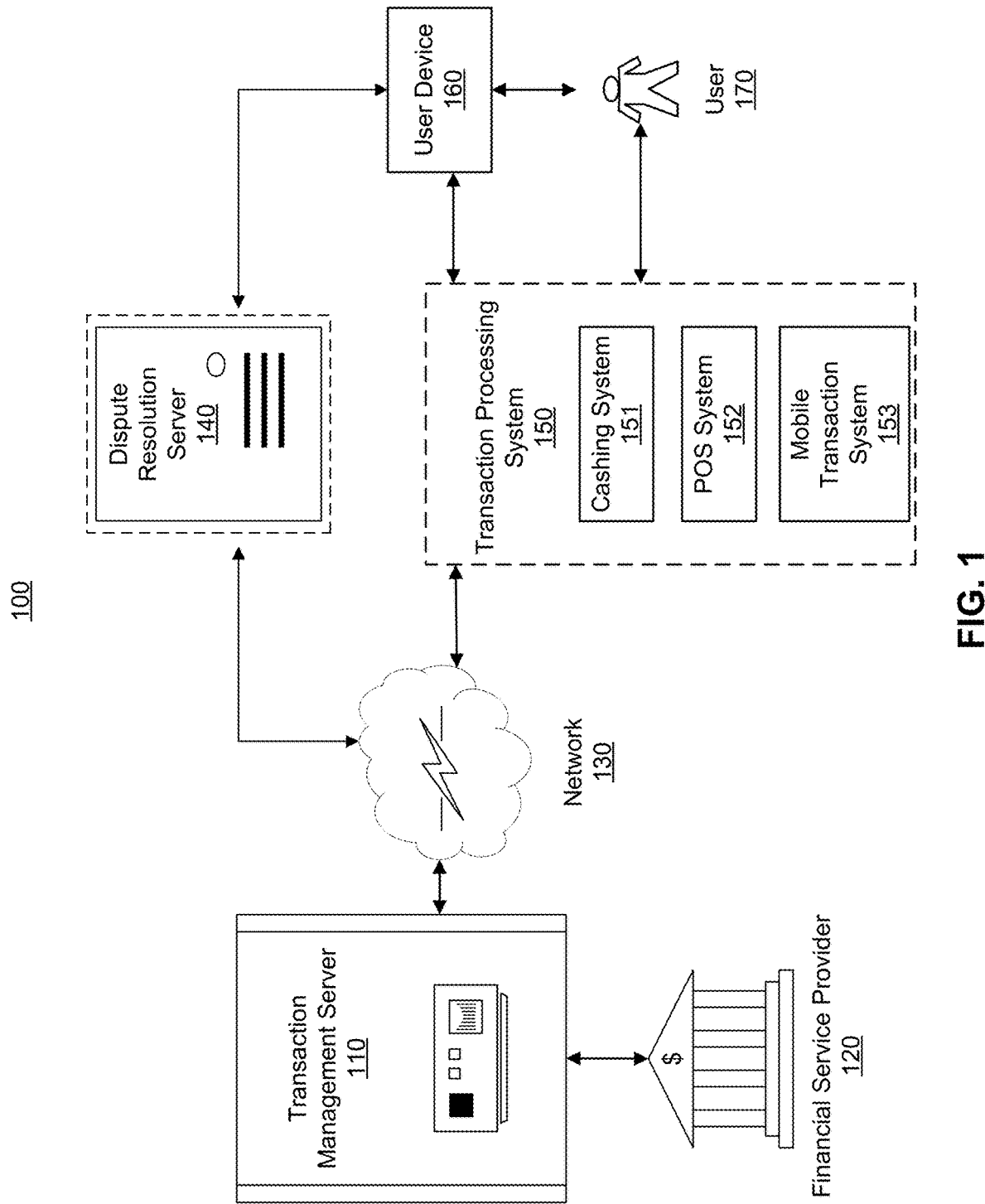
FIG. 1 is a diagrammatic representation of an exemplary system for processing financial transactions, consistent with the disclosed embodiments.

The disclosed embodiments include systems and methods for processing financial transactions. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Further, it is to be understood that the phraseology and terminology employed herein, as well as in the accompanying drawings, are for the purpose of description and should not be regarded as limiting. Those skilled in the art will appreciate that the conception upon which this disclosure is based may readily be utilized as a basis for designing other structures, methods, and systems for carrying out the several purposes of the present disclosure.

The following provides detailed description of several embodiments of the present disclosure, examples of which are illustrated in the accompanying drawings. Wherever possible, the same reference numbers will be used throughout the drawings to refer to the same or like parts.

Existing dispute resolution mechanisms rely on a user calling or otherwise contacting a representative of a financial service provider to report unauthorized transactions and initiate a transaction dispute. This frustrates user experience given the delays in taking protective measures to prevent additional authorized transactions, as well as discontinuity and disruption in user-authorized upcoming transactions. Based on solutions of the present disclosure, a user can initiate a transaction dispute through an online platform associated with a financial service provider anytime. For example, though an application or API (application program interface) associated with a financial service application, the user can access historical transactions and initiate a transaction dispute through a dispute resolution interface. Based on the user input, a dispute instruction can be sent to a dispute resolution server in real time. The dispute resolution server can, based on the user's transaction history, acquire a list of scheduled payments associated with the existing and compromised account number. Scheduled payments can include payments that are initiated but not yet completed. For example, these can include fund transfers set to occur at a scheduled time, and payments that are being processed but not completed. The user can authorize legitimate scheduled payments and cancel unauthorized items (for example, fraudulent items) associated with the compromised account number. For ease of description, account number used herein can refer to a payment identifier (such as a card number) associated with a user's financial service account. The account number can be assigned by a financial servicer provider and issued to the user, allowing the user to access and dispose funds in the user's financial service account. The account number may or may not be identical to the number directly identifying the underlying user account. In some embodiments, the financial service provider may assign more than one account number to the user, which link to the same underlying user account and funds therein. For example, the user may have two debit cards with two different account/card numbers linked to the same underlying checking account.

In addition, the dispute resolution server can determine a plurality of expected transactions, based on the user's transaction history. These can include periodical charges linked to the user's account, such as monthly service payments for the internet, utility, rent, or gym membership. These can further include transactions for services or products that the user frequently purchases, such as payments for a particular vendor or online service platform. To avoid discontinuity of these payments, the dispute resolution server can determine and cause a list of expected transactions to be displayed to the user and request the user's authorization to proceed. Upon receiving the user's authorization, the dispute resolution server can process payments for these expected transactions by, for example, updating payment information for an associated service account. As an example, the dispute resolution server may cancel the user's compromised account number (such as a comprised credit card number) and issue a new account number (such as a new/replacement credit card number). The dispute resolution server may update the user's utility service account with the new/replacement credit card number. That way, upcoming charges for the user's utility service can be processed with the new credit card number, even before the user receives the new physical credit card and without the need of the user manually updating payment information for the utility service account.

Moreover, the dispute resolution server can send real-time updates on the transaction dispute to the user through user-selected communication channel(s), such as emails, text or voice messages, or in-app notifications. That way, the user can be updated in real-time, reducing anxiety and improving user experience. These and other advantages of the solutions disclosed herein are further described below.

FIG. 1 is a diagrammatic representation of an exemplary system 100 for processing financial transactions, consistent with the disclosed embodiments. In some embodiments, financial transactions processed by system 100 may be in the form of check payments, debit card payments, credit card payments, electronic payments made through the Automated Clearing House (ACH) Network, Real-Time Payment Network, wire transfers, electronic payments, peer-to-peer payments, mobile payments (e.g., Apple Pay®), electronic fund payments (e.g., Zelle®), or the like. Moreover, the payments processed by system 100 may include recurring payments, such as payments associated with utility services, weekly paychecks to an employee through direct deposits, mortgage payments, or the like. As shown in FIG. 1, system 100 includes a transaction management server 110 associated with a financial service provider 120, a network 130, a dispute resolution server, a transaction processing system 150, a user device 160 associated with a user 170.

Transaction management server 110 may include one or more computer systems associated with one or more financial entities, such as financial service provider 120. Transaction management server 110 may further be associated with an Interbank Network (such as NYCE®, INTERAC®, or the like). Interbank Networks allow money systems (such as automated teller machines (ATMs) or payment terminals) to access deposit or other accounts. For example, transaction management server 110 may enable the use of ATM cards issued by a bank to be used at a point of sale through an EFTPOS (Electronic Fund Transfer at Point Of Sale) system. An EFTPOS transaction could be received by transaction management server 110 and routed to the appropriate bank holding the account.

In some embodiments, transaction management server 110 may provide transaction processing services between user 170 and financial service provider 120 through transaction processing system 150. In some embodiments, transaction management server 110 can receive one or more requests for processing transactions initiated by user 170 (e.g., by a card swipe, a mobile payment, an online payment, or the like) or transaction processing system 150. In some embodiments, transaction management server 110 may be developed and operated by a third-party service provider authorized by financial service provider 120 to manage financial transactions.

Transaction management server 110 may include one or more components that perform processes consistent with the disclosed embodiments. For example, transaction management server 110 may include one or more computers (e.g., server computers, database systems, etc.) that execute software instructions programmed to perform aspects of the disclosed embodiments, such as collecting data regarding transaction requests, processing transaction requests according to one or more transaction rules, processing authentication requests, authorizing transactions, transmitting authorization responses, or settling completed financial transactions.

Financial service provider 120 may be an entity that provides financial services. For example, financial service provider 120 may be a bank, a check clearinghouse, or another type of financial service entity that configures, offers, provides, and/or manages financial service accounts, such as checking accounts, savings accounts, debit card accounts, credit card accounts, loyalty accounts, etc. These financial service accounts may be used by user 170 to purchase goods and/or services.

Network 130 may provide a connectivity infrastructure for enabling communication among the various entities within system 100 for processing transactions. In some embodiments, network 130 may be implemented as part of or in conjunction with a Local Area Network (LAN), a Wide Area Network (WAN) (such as the internet), a cellular network, a public switched telephone network ("PSTN"), and may be a single network or a combination of networks. In some embodiments, network 130 may be implemented as a single type of network or a combination of different types of networks (e.g., networks for wireline and/or wireless communications). In some embodiments, network 130 may also utilize cloud computing technologies (e.g., for storage, caching, or the like). It is appreciated that implementation of network 130 is not limited to the above examples, and system 100 may implement any type of network that allows the entities (shown and not shown) included in FIG. 1 to exchange data and information.

Dispute resolution server 140 can be a system facilitating resolution of transaction disputes and can be a part of or associated with transaction management server 110. For example, dispute resolution server 140 can be a designated dispute resolution platform serving customers of financial service provider 120. Dispute resolution server 140 can be in the form of a computer-based system including computer system components, workstations, memory devices, and internal network(s) connecting these components. In some embodiments, dispute resolution server 140 can receive a transaction dispute instruction from user device 160, suspend or cancel the compromised account number, initiate an investigation into the disputed transaction. Dispute resolution server 140 may further issue provisional credit to the user's financial service account while the investigation is pending. In some embodiments, dispute resolution server 140 can determine, based on the user's transaction history, a list of scheduled payments under the compromised account number and request user confirmation whether to proceed with the scheduled payments. In some embodiments, dispute resolution server 140 can further determine a list of expected transactions based on the user's transaction history. Based on the user's authorization, dispute resolution server 140 can update payment information associated with the upcoming transactions with the newly issued account number so that these transactions can go through without disruption. As an example, with the user's authorization, dispute resolution server 140 can send an instruction to transaction management server 110 to proceed with the authorized transactions. Transaction management server 110 can communicate with the transaction processing system 150 accordingly to process payments for the authorized transactions. In some embodiments, dispute resolution server 140 can provide one or more updates on the dispute investigation to user device 160.

Transaction processing system 150 can be used to process payments or fund transfers. Transaction processing system 150 may include a cashing system 151, a point-of-sale (POS) system 152, and a mobile transaction system 153 associated with an online transaction platform. Cashing system 151 may be implemented as a computer or other electronic device operable to receive a cash withdrawal transaction request from user device 160. In some embodiments, cashing system 151 may be implemented as an ATM configured to receive data associated with user 170 and can be implemented at retail or financial service locations. For example, cashing system 151 may receive payment account information from user 170 (e.g., by a card swipe) and transmit a cash withdrawal transaction request to transaction management server 110. In some embodiments, cashing system 151 may also receive a cash withdrawal transaction request from user device 160 (e.g., an authenticated smartphone) associated with user 170 through an application program interface (API). Cashing system 150 may be configured to receive instructions from transaction management server 110 for dispensing cash to user 170.

POS system 152 may be a computer system or other electronic device operable to transmit a POS transaction request for completing a financial transaction using a cash substitute. For example, POS system 152 may include one or more POS machines. The POS machines may receive an account number (e.g., by a card swipe, a chip-card insertion, a contactless-card tap, or the like) from user 170. In another example, POS system 152 may include a mobile payment machine that may receive the account number (e.g., by receiving an NFC tap, scanning a QR code, or the like) from user device 160 that provides a digital wallet (e.g., Apple Pay®, Google Pay®, Samsung Pay®, or the like). After receiving the account number, POS system 152 may transmit a POS transaction request that includes the account number to transaction management server 110 for identifying a financial service account associated with user 170. In some embodiments, transaction management server 110 may send an additional request to POS system 152 to receive an identifier (e.g., a PIN number) for some types of transactions (e.g., a debit card transaction). POS system 152 may receive the identifier from user 170 (e.g., by receiving a keypad input) or user device 160 (e.g., by receiving a touchscreen input) and send the identifier to transaction management server 110 to request an authorization to proceed with the transaction. If authorized, POS system 152 may receive an indication (e.g., a receipt, a text message, a push notification, an information page, or the like) from transaction management server 110 that payment is authorized.

In some embodiments, POS system 152 may also be operable to split the monetary amount of the POS transaction request into more than one portion and create a corresponding number of POS transaction requests for completing the financial transaction using any combination of cash or one or more cash substitutes, which may allow a customer to utilize more than one mode of payment to purchase goods or services. In that case, POS system 152 may split the monetary amount and generate a corresponding number of POS transaction requests with the portions of the monetary amount. POS system 152 may then process each of the POS transaction requests. In some embodiments, POS system 152 may be implemented as an attended machine (e.g., by a cashier or clerk) or an automated kiosk (e.g., by user 170 actuating a screen or buttons on an unmanned or cashier-less kiosks) operable to transmit a request for processing payment of the transaction to transaction management server 110.

Mobile transaction system 153 can be an online transaction platform, such as an e-commerce website or an online service platform facilitating fund transfer between different financial service accounts. In some embodiments, user 170 may initiate an electronic payment using user device 160. For example, user device 160 may be installed with applications such as Apple Pay® or Zelle®, which can be used to initiate a payment or fund transfer. User 170 may also use user device 160 to conduct transactions and transfer funds using a secure internet account through a third party platform (such as PayPal). User device 160 may be a mobile phone, a personal computer, a wearable device (e.g., a smartwatch, smart glasses, etc.), a messaging device, a gaming console, a tablet computer, a personal digital assistant, or the like.

It is appreciated that FIG. 1 is exemplary only and system 100 may include additional or alternative configurations, which are not limited herein. Further, in some embodiments, processing described as being performed by one component of the system can be performed by another component. For example, processing performed by dispute resolution server 140 may be performed by the transaction management server 110 or an associated system. Dispute resolution server 140 can send an instruction to transaction management server 110, instructing transaction management server 110 to conduct the dispute investigation. As another example, in some embodiments, provisional credit for a disputed transaction can be issued either by dispute resolution server 140 or by transaction management server 110. In some embodiments, dispute resolution server 140 can be implemented in software form or as a functional part of transaction management server 110.

Figure 2:
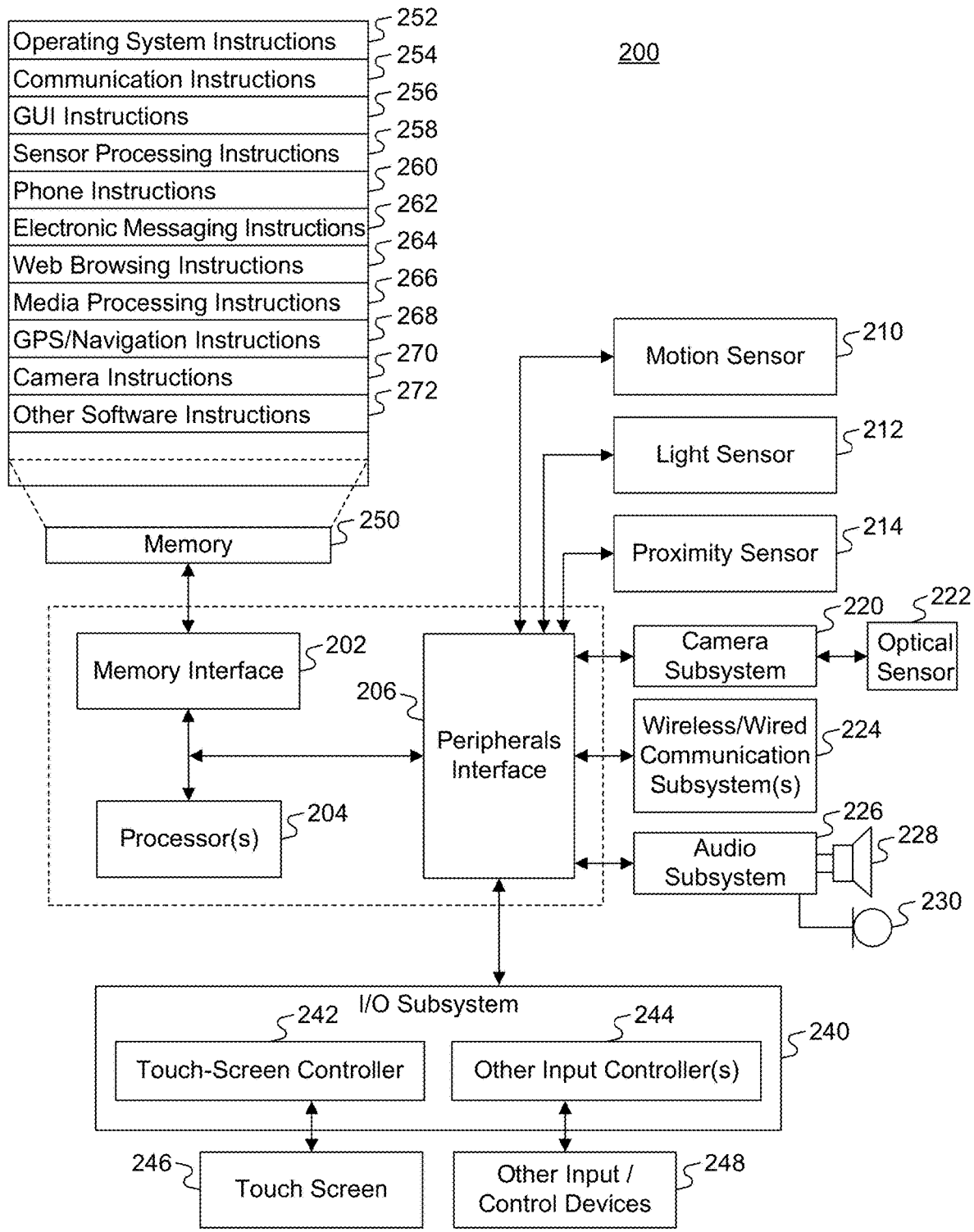
FIG. 2 is a diagrammatic representation of an exemplary user device, consistent with the disclosed embodiments.

FIG. 2 is a diagrammatic representation of an exemplary user device 200, consistent with the disclosed embodiments. User device 200 can be used to implement computer programs, applications, methods, processes, or other software to perform embodiments described in the present disclosure. User device 200 can serve as user device 160 described above with reference to FIG. 1. As shown in FIG. 2, user device 200 includes a memory interface 202, one or more processors 204, such as data processors, image processors and/or central processing units, and a peripherals interface 206. Memory interface 202, one or more processor(s) 204, and/or peripherals interface 206 can be separate components or can be integrated in one or more integrated circuits. The various components in user device 200 can be coupled by one or more communication buses or signal lines.

Sensors, devices, and subsystems can be coupled to peripherals interface 206 to facilitate multiple operations. For example, a motion sensor 210, a light sensor 212, and a proximity sensor 214 can be coupled to peripherals interface 206 to facilitate orientation, lighting, and proximity functions. Other sensors can also be connected to peripherals interface 206, such as a positioning system (e.g., GPS receiver), a temperature sensor, a biometric sensor, or other sensing device, to facilitate related functionalities. A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips. In cases where user device 200 is implemented in the form of a smart phone, various other sensors can be built into the device.

Communication functions may be facilitated through one or more wireless/wired communication subsystems 224, which can include an Ethernet port, radio frequency receivers and transmitters, and/or optical (e.g., infrared) receivers and transmitters. The specific design and implementation of wireless/wired communication subsystem 224 depends on the communication network(s) over which user device 200 is intended to operate. For example, in some embodiments, user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

An I/O subsystem 240 can include a touch screen controller 242 and/or other input controller(s) 244. Touch screen controller 242 can be coupled to a touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 are coupled to other input/control devices 248, such as one or more buttons, rocker switches, thumb-wheel, infrared port, USB port, and/or a pointer device such as a stylus. Touch screen 246 can, for example, also be used to implement virtual or soft buttons and/or a keyboard.

Memory interface 202 can be coupled to a memory 250. Memory 250 can include high-speed random access memory and/or nonvolatile memory, such as one or more magnetic disk storage devices, one or more optical storage devices, and/or flash memory (e.g., NAND, NOR). Memory 250 can store an operating system 252, such as DARWIN, RTXC, LINUX, iOS, UNIX, OS X, WINDOWS, or an embedded operating system. Operating system 252 can include instructions for handling basic system services and for performing hardware dependent tasks. In some implementations, operating system 252 can be a kernel (e.g., a UNIX kernel).

Memory 250 may also store communication instructions 254 to facilitate communicating with one or more additional devices, one or more computers and/or one or more servers, such as dispute resolution server 140, transaction processing system 150, or transaction management server 110 as described above with reference to FIG. 1. Memory 250 can include graphical user interface (GUI) instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

Each of the above identified instructions and software applications may correspond to a set of instructions for performing one or more functions described herein. For example, electronic messaging instructions 262 may include instructions for transmitting and receiving electronic messages regarding a financial service, such as processing status of one or more transactions and status of a dispute investigation. Graphical user interface (GUI) instructions 256 may include instructions for displaying user interface(s) associated with dispute resolution (such as those illustrated in FIGS. 7-17), allowing the user device to send instructions to dispute resolution server 140, view past disputes and pending transactions, etc.

In some embodiments, user device 200 can be implemented in the form of a smart phone. User device 200 may have various applications installed, such as a financial service application associated with transaction management server 110 allowing the user to access and manage funds. Memory 250 may store instructions or software programs required for performing functions provided by the various applications. A user may use user device 200 to initiate an electronic payment through the financial service application. For example, in one embodiment, processor(s) 204 may execute the instructions to display a user interface on touch screen 246, payment information (e.g., a name, an account number, a date, a verification code, etc.) for the user to confirm (e.g., by entering authentication information, biometric authentication, or the like). When payment information is confirmed, processor(s) 204 may send transaction data via wireless/wired communication subsystem(s) 224 to a transaction management server (such as transaction management server 110 depicted in FIG. 1) for processing. After receiving the transaction data, transaction management server 110 may authorize the payment, allowing corresponding funds to the withdrawn or transferred.

It is appreciated that the instructions corresponding to the functions described herein may be implemented as separate software programs, procedures, or modules. Furthermore, various functions of user device 200 may be implemented in hardware and/or in software, including in one or more signal processing and/or application specific integrated circuits.

Figure 3:
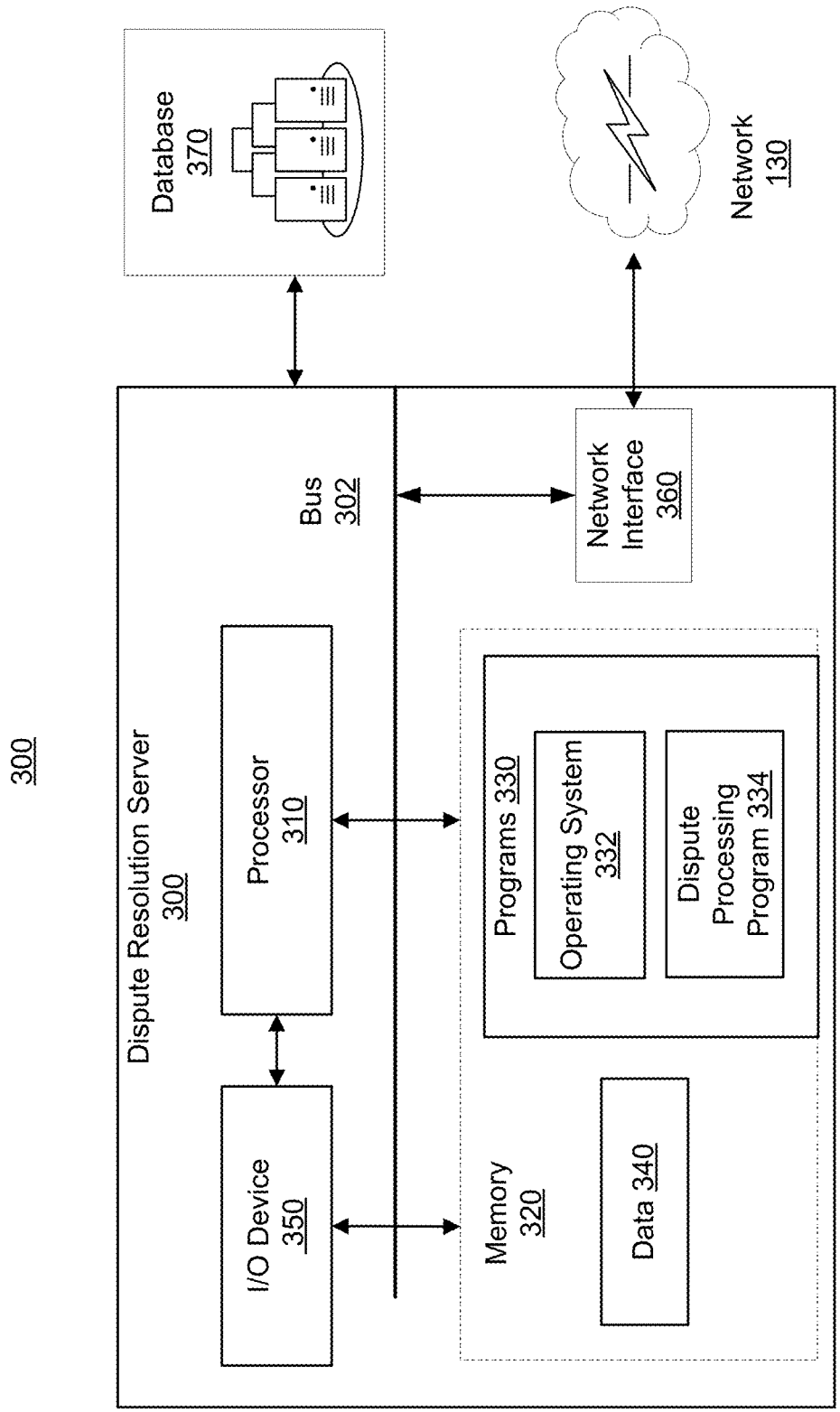
FIG. 3 is diagrammatic representation of an exemplary dispute resolution server, consistent with the disclosed embodiments.

FIG. 3 is diagrammatic representation of an exemplary dispute resolution server 300, consistent with the disclosed embodiments. Dispute resolution server 300 may serve as dispute resolution server 140 in system 100 as depicted in FIG. 1, and can be associated with transaction management server 110. Dispute resolution server 300 may include one or more computing devices configured to execute software instructions to perform one or more transaction dispute resolution processes consistent with the disclosed embodiments.

As shown in FIG. 3, dispute resolution server 300 includes a bus 302 (or other communication mechanism) which interconnects subsystems or components for transferring information within dispute resolution server 300. Dispute resolution server 300 further includes a processor 310, a memory 320 storing programs 330 and data 340, an I/O device 350 and a network interface 360. Programs 330 can include, for example, an operating system 332 and a dispute processing program 334. Network interface 360 can include a modem, Ethernet card, or any other interface configured to exchange data with a network such as network 130 as shown in FIG. 1. Dispute resolution server 300 can further be associated with database 370.

Processor 310 may include one or more processing devices configured to perform methods and functionalities disclosed herein, such as a microprocessor manufactured by Intel™ or AMD™. Processor 310 may include a single core or multiple core processors executing parallel processes simultaneously. For example, processor 310 may be a single core processor configured with virtual processing technologies. In some embodiments, processor 310 may use logical processors to simultaneously execute and control multiple processes. Processor 310 may implement virtual machine technologies, or other technologies to provide the ability to execute, control, run, manipulate, store, etc., multiple software processes, applications, programs, etc. In some embodiments, processor 310 may include a multiple-core processor arrangement (e.g., dual core, quad core, etc.) configured to provide parallel processing functionalities to allow dispute resolution server 300 to execute multiple processes simultaneously. It is appreciated that other types of processor arrangements could be implemented that provide for the capabilities disclosed herein.

Memory 320 may be a volatile or nonvolatile, magnetic, semiconductor, tape, optical, removable, non-removable, or other type of storage device or tangible or non-transitory computer-readable medium that stores one or more programs 330 such as operating system 332 and dispute processing program 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Programs 330 include one or more software modules configured to cause processor 310 to perform one or more functions consistent with the disclosed embodiments. Moreover, processor 310 may execute one or more programs located remotely from one or more components of dispute resolution server 300. For example, dispute resolution server 300 may access one or more remote programs that, when executed, perform functions related to the disclosed embodiments.

Programs 330 further include operating system 332 performing operating system functions when executed by one or more processors such as processor 310. By way of example, operating system 332 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, embodiments of the present disclosure may operate and function with computer systems running various types of operating system 332. Dispute resolution server 300 may also include software that, when executed by a processor, provides communications with network 130 through network interface 360 and/or a direct connection to one or more user devices, such as user device 160.

Dispute processing program 334 can include one or more software modules for performing various functions facilitating transaction dispute resolution. For example, upon receiving a dispute instruction from user device 160, dispute processing program 334, through execution by processor 310, can freeze a (potentially) compromised account number and communicate with an associated transaction management server, such as transaction management server 110 as shown in FIG. 1 to initiate a dispute investigation. Dispute processing program 334 can further be executed to cause processor 310 to issue provisional credit for the disputed transaction. To facilitate processing of scheduled payments and upcoming transactions associated with the compromised account number, dispute processing program 334 can further be executed to cause processor 310 to determine a list of scheduled payments and expected transactions for obtaining user confirmation whether to proceed. In addition, dispute processing program 334 can also include instructions to cause processor 310 to send status updates to user device 160 regarding the dispute investigation, such as presenting status update notifications on a user interface. Exemplary dispute processing and associated procedures are further explained below with reference to FIGS. 4-6.

In some embodiments, programs 334 may further include software modules/instructions for processing transactions, either alone or through cooperation with transaction management server 110. For example, upon receiving user authorization to proceed with one or more scheduled payments or expected transactions, dispute resolution server 300 may send a processing request directly to a transaction processing system such as transaction processing system 150 or indirectly through transaction management server 110. Dispute resolution server 300 can instruct transaction processing system 150 to process authorized payments or proceed with authorized expected transactions. In some embodiments, dispute resolution server 300 may access a third party service account of the user to update payment information with a replacement account number, or apply credit for completing one or more upcoming transactions as authorized by the user.

Data 340 may include various information associated with processing performed by processor 310. For example, data 340 may include information associated with financial service accounts of various users, such as user 170, and information associated with respective user devices, such as user device 160. Data 340 may further include transaction history of the various users and records of each transaction, such as dates of transaction, identification information of parties involved in the transactions, account and contact information of the parties, and the products/services involved. In addition, data 340 may further include previous transaction disputes associated with the users, and status information thereof. Data 340 may further include data associated with communications between dispute resolution server 300, transaction management server 110, and user device 160.

I/O devices 350 can have one or more interfaces for receiving signals or input from devices and providing signals or output to one or more devices that allow data to be received and/or transmitted by dispute resolution server 300. For example, dispute resolution server 300 may include interface components for interfacing with one or more input devices, such as one or more keyboards, mouse devices, and the like, that enable dispute resolution server 300 to receive input from an operator or administrator (not shown). It is appreciated that the configuration shown in FIG. 3 is exemplary only, and dispute resolution server 300 may include alternative or additional components, which are not limited by the present disclosure.

Database 370 can include one or more physical or virtual storage devices and can be configured to store data associated with processing performed by dispute resolution server 300. In some embodiments, database 370 can be a designated data storage terminal storing aggregated dispute resolution data associated with various user accounts. In some embodiments, database 370 can be implemented as an internal database component of dispute resolution server 300 and can store information similarly included in data 340. Database 370 can include any combination of one or more databases controlled by memory controller devices (e.g., server(s), etc.) or software, such as document management systems, Microsoft SQL databases, SharePoint databases, Oracle™ databases, Sybase™ databases, or other relational databases or non-relational databases, such as Hadoop™ sequence files, HBase™, or Cassandra™.

In some embodiments, database 370 may include computing components (e.g., database management system, database server, etc.) configured to receive and process requests for data stored in memory devices of the database and to provide data from the database. For example, a database management system for database 370 can be configured to, using machine learning models, determine a list of expected transactions associated with user account based on the user's transaction history. The database management system can further acquire contact information of an entity involved in a transaction with the user and cause such information to be transmitted to user device 160 for the user's reference.

It is appreciated that the configuration shown in FIG. 3 is exemplary only, and dispute resolution server 300 may include alternative or additional components, which are not limited by the present disclosure.

Figure 4:
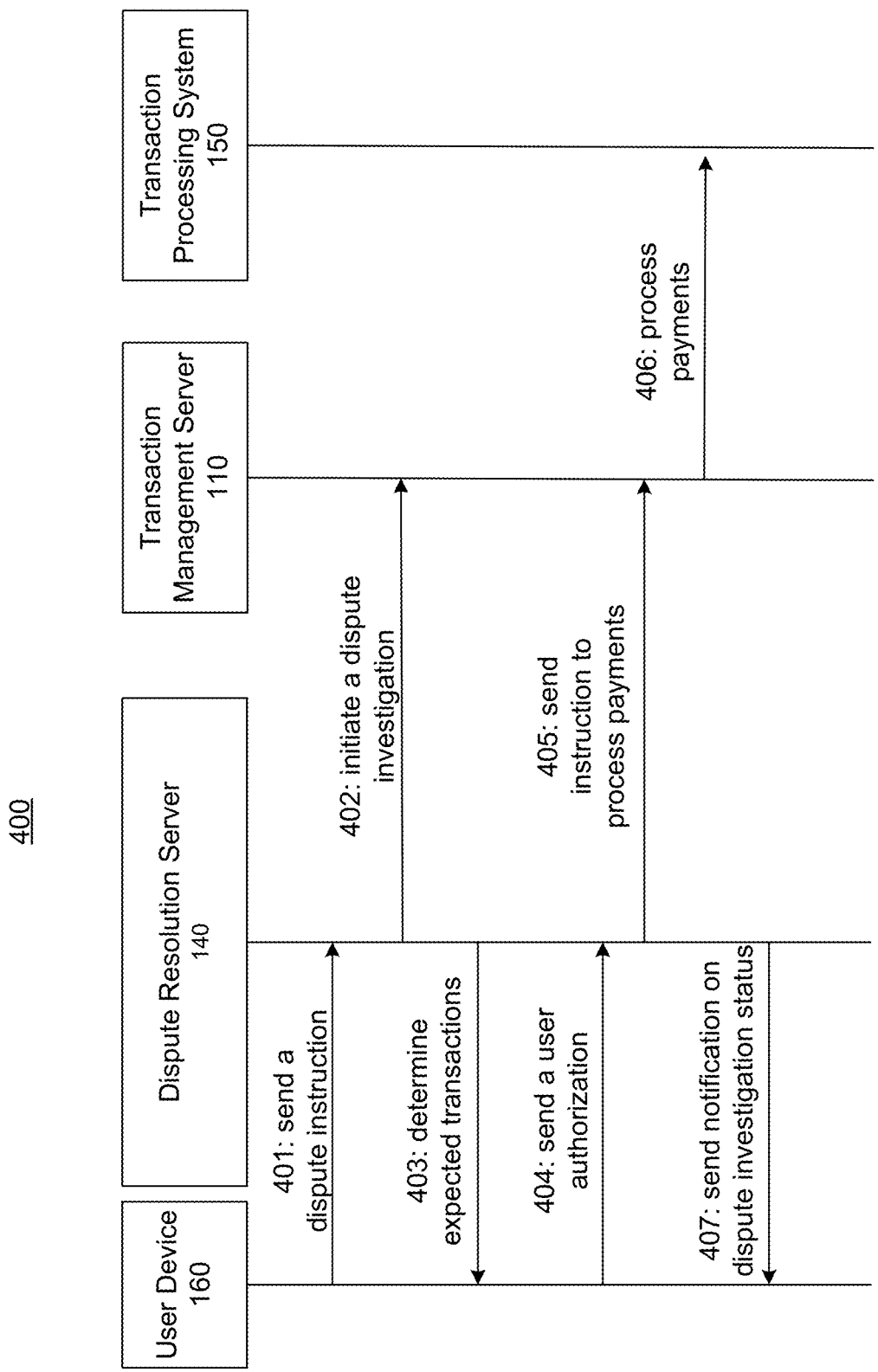
FIG. 4 is a diagrammatic representation showing exemplary interactions involved in a dispute resolution process, consistent with the disclosed embodiments.

FIG. 4 is a diagrammatic representation showing exemplary interactions 400 involved in a dispute resolution process, consistent with the disclosed embodiments. For ease of description, descriptions of interactions 400 refer to components described above in system 100 of FIG. 1. As shown in FIG. 4, interactions 400 include procedures 401-407.

In step 401, user device 160 sends a dispute instruction to dispute resolution server 140 to dispute a transaction. In some embodiments, user device 160 can send the dispute instruction based on a user's interaction and operation through a user interface associated with a financials service application. For example, the user may view his or her transaction history on the user interface and discover abnormal or problematic charges (such as potential fraudulent charges, payments to an unknown payee, or duplicated charges). The user may initiate the dispute and cause user device 160 to send the dispute instruction by selecting a corresponding button.

In step 402, after receiving the dispute instruction, dispute resolution server 140 initiates a dispute investigation and notifies transaction management server 110 that the existing user account number is compromised. Dispute resolution server 140 may further instruct transaction management server 110 to freeze the user account and suspend all pending and future transactions under the compromised account number. In some embodiments, transaction management server 110 may communicate with transaction processing system 150 to cancel/suspend any pending transaction to mitigate risk of additional problematic transactions. That way, in cases where the account number was exposed to an unauthorized third party, further payments/transfer initiated by the unauthorized third party can be promptly prevented.

In step 403, dispute resolution server 140 may determine one or more expected transactions associated with the user account, and transmit the expected transactions to user device 160. The expected transactions can include, for example, periodically recurring transactions associated with the user account, such as monthly rent and utility payments. Dispute solutions server 140 can further obtain a list of scheduled payments under the comprised account number and cause information of the scheduled payments to be transmitted and displayed on user device 160. For example, the scheduled payments may include payments initiated and authorized by the user, as well as unauthorized payments for transactions initiated by a third party using the compromised account number.

In step 404, user device 160 can send a user authorization to process with one or more of the expected transactions. This can be implemented through user interaction with a user interface and provide input selecting one or more expected transactions to indicate authorization. In some embodiments, user device 160 may further send an instruction indicating user disapproval of certain transactions. Similarly, user device 160 can also send a user authorization for processing one or more of the scheduled payments (in some cases, the user may not authorize any of the scheduled payments).

In step 405, based on the received user authorization, dispute resolution server 140 may send instructions to transaction management server 110 to process the authorized payments and transactions.

In step 406, transaction management server 110 may communicate with transaction processing system 150 or one or more subsystems contained therein to process the authorized payments and transactions. This can include, for example, sending instructions to cashing system 151 to allow processing of authorized cash withdrawal, sending instructions to POS system 152 to allow exchange or transfer of cash-substitutes, or sending instructions to mobile transaction system 153 associated with third party service platforms to update payment information associated with the user. In some embodiments, after processing the authorized payments, transaction processing system 150 may return a reporting messaging indicating the status of the processed payments. Transaction processing system 150 may send the reporting message to transaction management server 110 and/or dispute resolution server 140. Dispute resolution server 140 can provide a corresponding payment status notification to the user device and cause the notification to be displayed on user device 160.

In step 407, dispute resolution server 140 sends a notification on the status of the dispute investigation to user device 160. For example, the notification may indicate that the dispute investigation is complete, and the provisional credit is confirmed. The notification can further indicate processing status of the scheduled payments and expected transactions authorized by the user. The notification can be sent via one or more preset communication channels based on user selection or preference. For example, settings associated with the account profile of the user may include selection of preferred communication channels, such as via text/voice messaging, email messages, or in-app notifications. In some embodiments, dispute resolution server 140 may utilize a notification module or API associated with a financial service application to generate and transmit notifications. For example, functioning of dispute resolution server 140 may be built into or combined with functions offered through the financial service application installed on user device 160. Dispute resolution-related notifications can be generated and transmitted in manners similar to those used by the financial service application to send other notifications, such as push notifications regarding low balance, upcoming payments, fund transfers, etc.

It is appreciated that interactions shown in FIG. 4 are exemplary only. Exemplary processing performed by dispute resolution server 140, alone or in combination with other components, is further described below with reference to FIGS. 5-6. Other implementations may include additional or alternative procedures, which are not limited by the present disclosure.

FIG. 5 is a flow chart of an exemplary process 500 for processing financial transactions, consistent with the disclosed embodiments. For ease of description, descriptions of process 500 refer to components described above in system 100 of FIG. 1. As shown in FIG. 5, process 500 include procedures 501-515.

In step 501, dispute resolution server 140 receives a dispute instruction for a transaction associated with the user account. The dispute instruction can be sent through a user interface associated with a financial service application installed on user device 160. Through the financial service application, user device 160 can communicate with dispute resolution server 140, such as transmitting transaction processing instructions or information associated with dispute solution. Dispute resolution server 140 can transmit information to user device 160 for display to the user through a user interface.

As an example, FIG. 7 is a diagrammatic representation of an exemplary user interface 700 showing a transaction history, consistent with the disclosed embodiments. User interface 700 may be associated with a financial service application installed on user device 160 or an associated "Dispute Concierge" component (701) of the financial service application handling transaction disputes. User interface 700 can be presented in the same or modified format or configuration on different types of user devices, depending on factors such as the operating system running on a particular device.

As shown in FIG. 7, user interface 700 includes different sections, such as a navigation menu 710, a profile section 720, and a display field 730. Navigation menu 710 may include various action buttons linking to different modules/pages, such as "activate card," or "chat with support." In some embodiments, user interface 710 may provide real-time or live chat functions allowing the user to communicate with support representatives (real or automated) of an associated financial service provider, to seek assistance with dispute resolution. Profile section 720 can include a user profile photo, date and time of the user's last login, and action buttons for user profile editing. Display field 730 can display information corresponding to an activated navigation button. As an example, when the user (in this example, Jane Smith) activates the "view transactions" button to view transactions of her "checking" account," a list of transactions under her checking account can be displayed in display field 730. User interface 700 may further include action buttons for switching between different financial service accounts of the user, such as savings, checking, credit card, brokerage, and the like.

When viewing her transactions, the user may notice abnormal transactions on charges on the displayed list. As shown in FIG. 8, the user may notice an abnormal "Convenience Store" transaction for an amount of "$400.00." The user may suspect that the charge is not authorized by her and her account may be comprised. Display field 730 may further include an action section associated with each listed transaction. The user may select the "Convenience Store" transaction and activate the "dispute transaction" button 810. Activation of "dispute transaction" button 810 may cause user device 160 to send a dispute instruction to dispute resolution server 140. Information related to the "Convenience Store" transaction can be transmitted along with the dispute instruction, or can be acquired by dispute resolution server 140 from an associated database, such as database 370 as described with reference to FIG. 3.

In some embodiments, user interface 700 or 800 may further include other options allowing the user to manage the account, such as buttons the user can select to temporarily freeze the account while the user investigates into potentially problematic transaction(s). As an example, the user may suspect the "Convenience Store" transaction to be an unauthorized charge, before the user activates "dispute transaction" button 810, the user may choose to investigate by looking into details of the transaction. To ensure account security and avoid potential risk while the user investigates, the user may temporarily freeze the account for a set period of time, such as an hour or two hours. In some embodiments, upon expiration of the period of time, the account may unfreeze automatically if no dispute is initiated (e.g., upon detecting "dispute resolution" button 810 not being selected within that period of time).

It is appreciated that the disputed transaction may include different types of transactions, such as a payment transaction (e.g., a purchase transaction) as in the above described example, a fund transfer transaction (e.g., transferring funds between accounts), an inquiry transaction (e.g., inquiring account balance at an ATM machine), a cash-related transaction (e.g., depositing or withdrawing cash from an ATM machine), a verification transaction (e.g., by swiping a card to verify original payment method), or the like. It is appreciated that the disputed transaction may be any transaction that requires the account number, and this disclosure does not limit its embodiments to the examples provided herein.

In some embodiments, dispute resolution server 140 may further leverage tools/techniques for monitoring fraudulent activity and alert the user to potentially fraudulent transactions so that transaction disputes can be detected and initiated in a timely manner. For example, dispute resolution server 140 (or another component of system 100, such as transaction management server 110) can monitor the user's transaction behavior and identify any abnormal spending/charges. These can include, for example, out of state or international charges, exceptionally large amounts such as transactions exceeding a pre-set daily spending limit, or duplicative charges relating to the same merchandize or services. In some embodiments, upon detecting potential fraudulent transactions, dispute resolution server 140 can generate and transmit a corresponding notification to user device 160, alerting the user or directing the user to an online platform (such as a financial service application) for viewing details of the transaction(s) at issue. The user can then view the transaction(s) and initiate a transaction dispute accordingly.

In step 503, after receiving the dispute instruction, dispute resolution server 140 initiates a dispute investigation regarding the disputed transaction. This may include acquiring, from transaction management server 110, a transaction record associated with the disputed transaction, such as tracking and delivery information of the service/goods involved, payment authorization (such as signature(s) approving payments), processing history of the payment, and account information of parties involved in the transaction.

Dispute resolution server 140 may cancel the current, compromised account number at the start of the dispute investigation or while the dispute investigation is pending. In some embodiments, dispute resolution server 140 may temporarily suspend the account number so that no further transactions can be conducted absent instructions from user device 160 or dispute resolution server 140. Dispute resolution server 140 may subsequently cancel the account number if the investigation reveals that the dispute charge is indeed an unauthorized transaction initiated by a third party.

Figure 9:
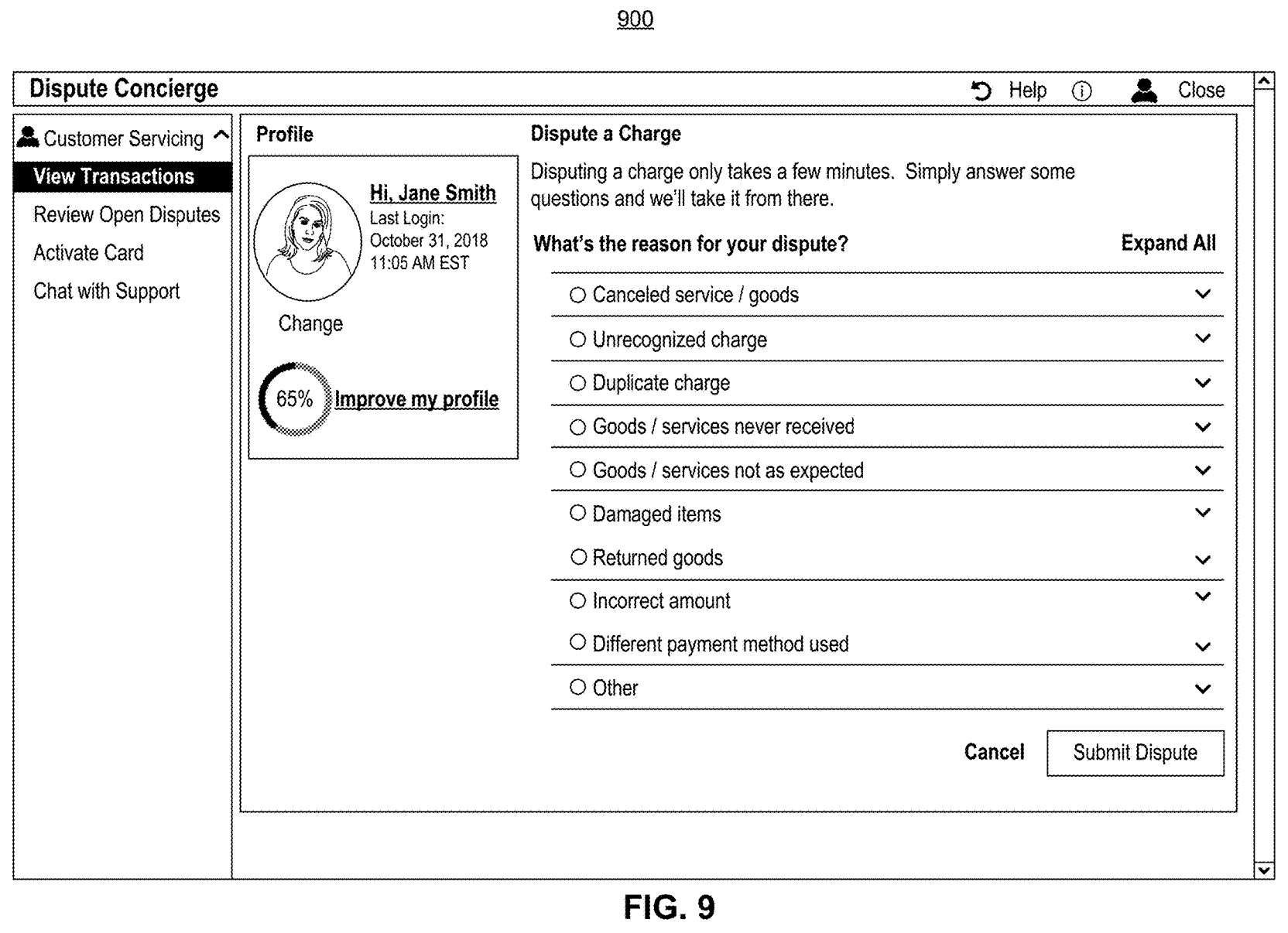

In some embodiments, when the dispute investigation is initiated, dispute resolution server 140 may further request additional information from user device 160 to assist with the investigation. For example, FIG. 9 is a diagrammatic representation of an exemplary user interface 900 showing exemplary reasons for a transaction dispute for user selection, consistent with the disclosed embodiments. As shown in FIG. 9, user interface 900 may include a list of potential reasons for the dispute. The user may select one or more of the reasons for the dispute, which can be transmitted to dispute resolution server 140. For example, the user may select "unrecognize charge" as the reason. Based on the user selection, dispute resolution server 140 may focus the investigation on initiation of the transaction, time and date of the transaction, and identity of the payee in the transaction. User selection of the reason(s) can help narrow the issues and expedite the investigation process.

In some embodiments, dispute resolution server 140 may request additional information from user device 160. As shown in user interface 1000 in FIG. 10, in some embodiments, dispute resolution server 140 may cause a dispute questionnaire to be displayed on user device 160. The questionnaire may include various items such as: the monetary amount the user is disputing (which may be the full or partial amount of the transaction); whether the transaction involves goods or services; the specific goods or services involved; and the like. Based on user input, user device 160 can transmit corresponding information to dispute resolution server 140.

Referring back to FIG. 5, in step 505, dispute resolution server 140 issues provisional credit to the user account for the transaction. The amount of the provisional credit can correspond to the disputed amount. Provisional credit can be reflected in the user account and can be spent or disposed by the user. Depending on the outcome of the dispute investigation, provisional credit can be reversed or removed from the user account, or confirmed. In some embodiments, dispute resolution server 140 may cancel or freeze the comprised account number and assign a replacement account number. The provisional credit can be associated with the replacement account number. Dispute resolution server 140 can further send a notification indicating the new replacement account number to user device 160 for display to the user. The new replacement account number can be activated based on user input. In some embodiments, activation of the replacement account number can occur at the same time as the cancellation of the compromised account number.

In some embodiments, issuance and application of the provisional credit can be in real-time or immediately upon initiation of the dispute. For example, once user device 160, based on user selection of the "dispute transaction" button 810 as shown in FIG. 8, sends the dispute instruction to dispute resolution server 140, dispute resolution server 140 can issue the provisional credit to the user account right away before performing further processing. The user can view the credit increase in its account balance immediately and access it to conduct transactions.

In step 507, dispute resolution server 140 determines a plurality of scheduled payments and expected transactions associated with the user account. In some embodiments, dispute resolution server 140 may acquire information of scheduled payments associated with the user account under the compromised account number from either an associated database, or from transaction management server 110. Scheduled payments can include one or more individual payments that are initiated but have not been completed, such as payments the user scheduled to occur on a specific date. These can include scheduled payments to occur through one or more of cashing system 151, POS system 152, and mobile transaction system 153. As shown in FIG. 11, dispute resolution server 140 may transmit information associated with a plurality of scheduled payments for display on user interface 1100.

Dispute resolution server 140 can further determine a plurality of expected transactions associated with the user account, based on the user's transaction history. For example, the user's transaction history may include periodically recurring transactions for certain goods or services, transactions associated with a particular transaction platform, or transactions associated with a particular third party. For example, these can include periodical payments for rents, utility services, gym memberships, or video streaming services. These can also include potential transactions the user may initiate through a particular e-commerce website. In some embodiments, determination of the expected transactions can be based on the user's transaction history within a preset time window, such as the past year, or the past six months. If within the preset time window, a particular transaction has occurred periodically (such as every month) with payments of a particular amount (or substantially similar amount) to the same third party, dispute resolution server 140 may determine an upcoming transaction with that amount due to that same third party. In some embodiments, the expected transactions can also include potential transactions with a particular merchant, with whom the user has conducted a number of transactions exceeding a preset threshold. For example, these may include transactions with an online store where the user has made multiple purchases in the last six months.

In some embodiments, dispute resolution server 140 can incorporate various data mining techniques based on artificial intelligence or machine learning, to determine scheduled payments or expected transactions a user may want to complete based on the user's transaction history. For example, machine learning algorithms such as Support Vector Machine (SVM), Polynomial Regression Model, or Random Forest, can be used to identify spending/consumption pattern and use the pattern to predict consumer behaviors and determine expected transactions. Different rules and variables can be defined to identify patterns of spending behavior, such as identifying transactions of the same dollar amount occurring at a particular frequency, transactions of defined categories (wellness such as gym membership, medical, entertainment, grocery, travel, etc.), transactions that occur within a certain geographical area (such as certain zipcodes), recency or frequency of transactions, or a combination of any of these or additional criteria.

Figure 12:
FIG. 12 is a diagrammatic representation of an exemplary user interface for processing expected transactions, consistent with the disclosed embodiments.
Figure 14:
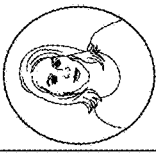
FIG. 14 is a diagrammatic representation of another exemplary user interface for processing expected transactions, consistent with the disclosed embodiments.

In step 509, the determined plurality of scheduled payments and expected transactions can be transmitted to and displayed on user device 160 to receive user authorization. As an example, FIG. 11 shows an exemplary user interface 1100 showing a plurality of scheduled payments under the compromised account number. FIG. 12 shows an exemplar user interface 1200 showing a plurality of expected transactions. User interfaces 1100 and 1200 can further include action buttons for receiving user input corresponding to each listed item. The user can select one or more of the listed items to indicate her authorization to proceed.

In step 511, dispute resolution server 140 receives transaction authorization for at least one of the plurality of scheduled payments and expected transactions. As indicated in FIG. 11, the user selects scheduled payments corresponding to "The Reals," "WebFlex," and "Wire Transfer," indicating her authorization to proceed. Unauthorized items, such as the unselected payment corresponding to "Shoe Store," may include an unrecognized transaction, a transaction potentially initiated by an unauthorized third party who may have obtained the comprised account number by illegitimate means, or a transaction the user no longer wishes to proceed. Based on the user input, user device 160 can send a corresponding instruction to dispute resolution server 140 to proceed with the authorized payments, and cancelling others. Similarly, as indicated in FIG. 12, the user selects the listed expected transactions corresponding to "Rent," "Movie Service," "TV Service," and "Middle School," indicating her authorization to proceed with these transactions with the listed amounts. Based on the user selection, user device 160 can send a corresponding instruction to dispute resolution sever 140 indicating the user authorization.

In other implementations, the user may indicate her authorization in various other manners, which are not limited herein. In some embodiments, to ensure security of the authorization process, dispute resolution server 140 may send, to another associated user device or through another communication channel, requesting the user to verify her identity. For example, prior to making selections on authorized payments or transactions, dispute resolution server 140 may send a temporary identifier to an associated user email account or cell phone, and request the user to provide the temporary identifier through user interface 1100 or 1200. Only if the temporary identifier is received within a preset valid period of time can the user proceed to make or submit selections.

In step 513, based on the received user authorization, dispute resolution server 140 processes payments for the at least one of the plurality of scheduled payments and expected transactions. The procedures involved in processing different payments and transactions may differ. For example, for an authorized scheduled payment, dispute resolution server 140 may send an instruction to transaction management server 110 to complete the payment at the scheduled date using funds in the underlying user account. Alternatively or additionally, dispute resolution server 140 may lift the suspension on that scheduled payment, allowing it to go through. In some embodiments, dispute resolution server 140 may complete the payment by applying credit, and subsequently withdraw corresponding funds from the underlying user account. In some embodiments, dispute resolution server 140 may replace the compromised account number with the newly issued replacement account number so that the scheduled payment can be completed with the replacement account number without user intervention. In some embodiments, the scheduled payments or expected transactions may be associated with a third party service account linked to the user account. Processing of the associated payments can be through updating payment information for the third party service account, such as using procedures depicted in FIG. 6, as further described below.

In some embodiment, dispute resolution server 140 can send processing status updates on the authorized payments and transactions. For example, as shown in FIG. 13, dispute resolution server 140 can send status update notifications to user device 160 for display through user interface 1300. As shown in FIG. 13, a status column includes processing status corresponding to each authorized expected transaction, followed by a brief description. In some embodiments, dispute resolution server 140 can further send the status update notifications to the use device through other communication channels. For example, settings associated with the financial service account may include default settings for communication with the user. Dispute resolution server 140 can send notifications to user device 160 based on the default settings.

In some embodiments, dispute resolution server 140 may be unable to complete an authorized payment or expected transaction. For example, this can occur due to security measures implemented by third parties, which may require changes of payment information or access of service accounts be performed by the user only. This can also occur in cases where the user does not subscribe to a required level of financial service or dispute resolution service. In those cases, dispute resolution server 140 may send a notification to user device 160 indicating the failure to process the transaction at issue. In some embodiments, dispute resolution server 140 may obtain information related to the transaction at issue, such as contact information of the third party involved in the transaction, or description of the attempt to process the transaction. As shown in the exemplary user interface 1400 in FIG. 14, for the transaction corresponding to "middle school," the user can activate the "details" button to view more details on the processing status. In this example, the details indicate that dispute resolution server 140 is unable to update payment information, and provides contact information for the user to reach out to the merchant involved in the transaction. The contact information can be determined based on, for example, one or more historical transactions involving the same merchant in the user's transaction history. In some embodiments, the details my further include a link to the merchant's website so that the user can easily access the website to process the transaction.

Figure 15:
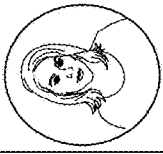
FIG. 15 is a diagrammatic representation of another exemplary user interface for processing expected transactions, consistent with the disclosed embodiments.
Figure 17:
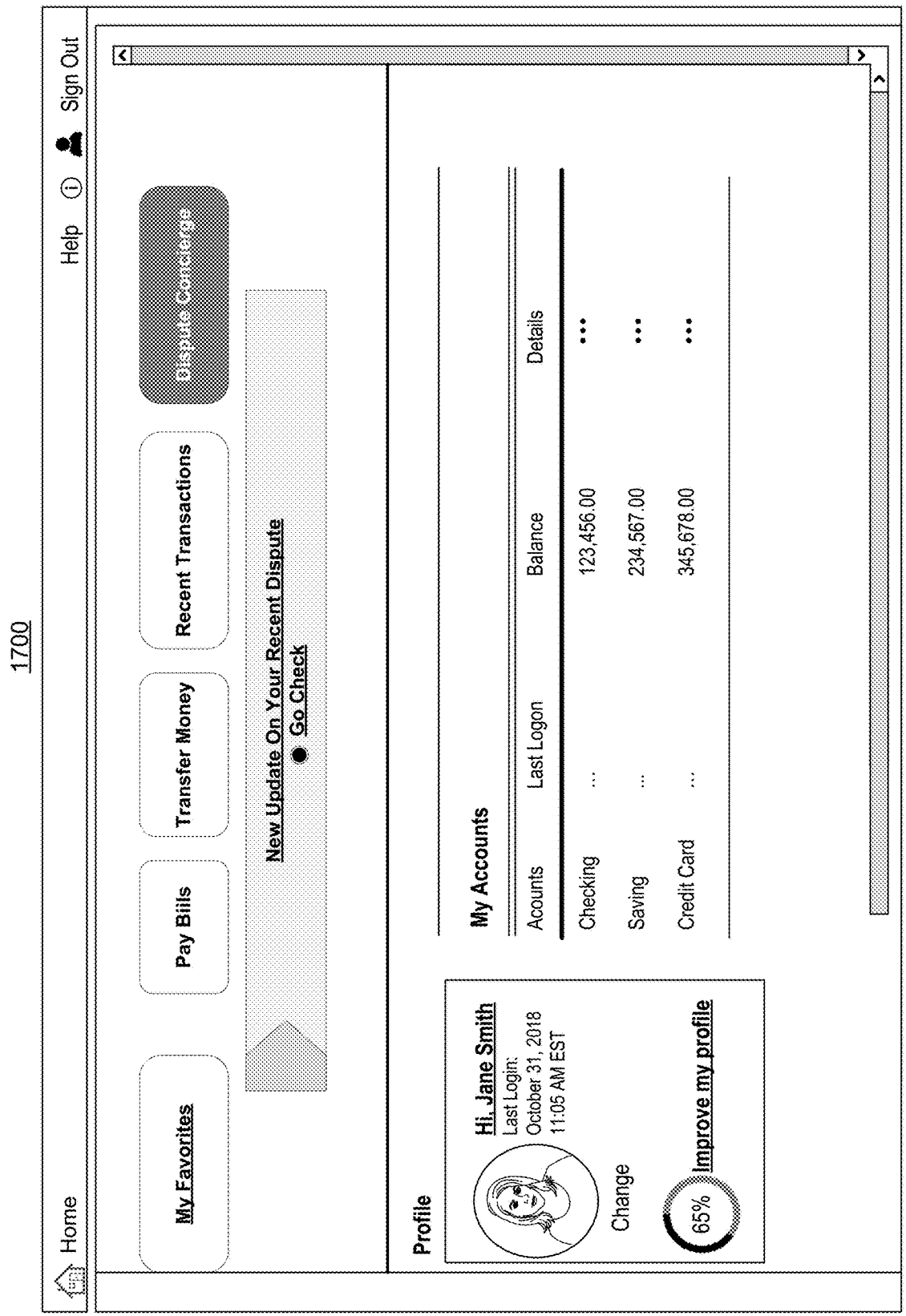
FIG. 17 is a diagrammatic representation of an exemplary user interface associated with a financial service application, consistent with the disclosed embodiments.

Referring back to FIG. 5, in step 515, dispute resolution server 140 can generate a notification message indicating an outcome of the dispute investigation. The notification message can be sent to the user via the financial service application, or via one or more user-selected communication channels. The notification message can further indicate confirmation, reversal, or partial reduction of the previously issued provisional credit, or additional credit issued to the user account based on the outcome of the dispute investigation. In some embodiments, dispute resolution server 140 may generate and transmit one or more update notifications while the investigation is pending, such as intermediate results or requests for additional user input. In some embodiments, the user may access a status indicator via a user interface associated with the financial service application, such as user interface 1500 as shown in FIG. 15. Dispute resolution server 140 may transmit status update information to user device 160 for display through user interface 1500. A user may activate a "details" button to view detailed description of the investigation status and previous status updates on the dispute investigation.

Figure 6:
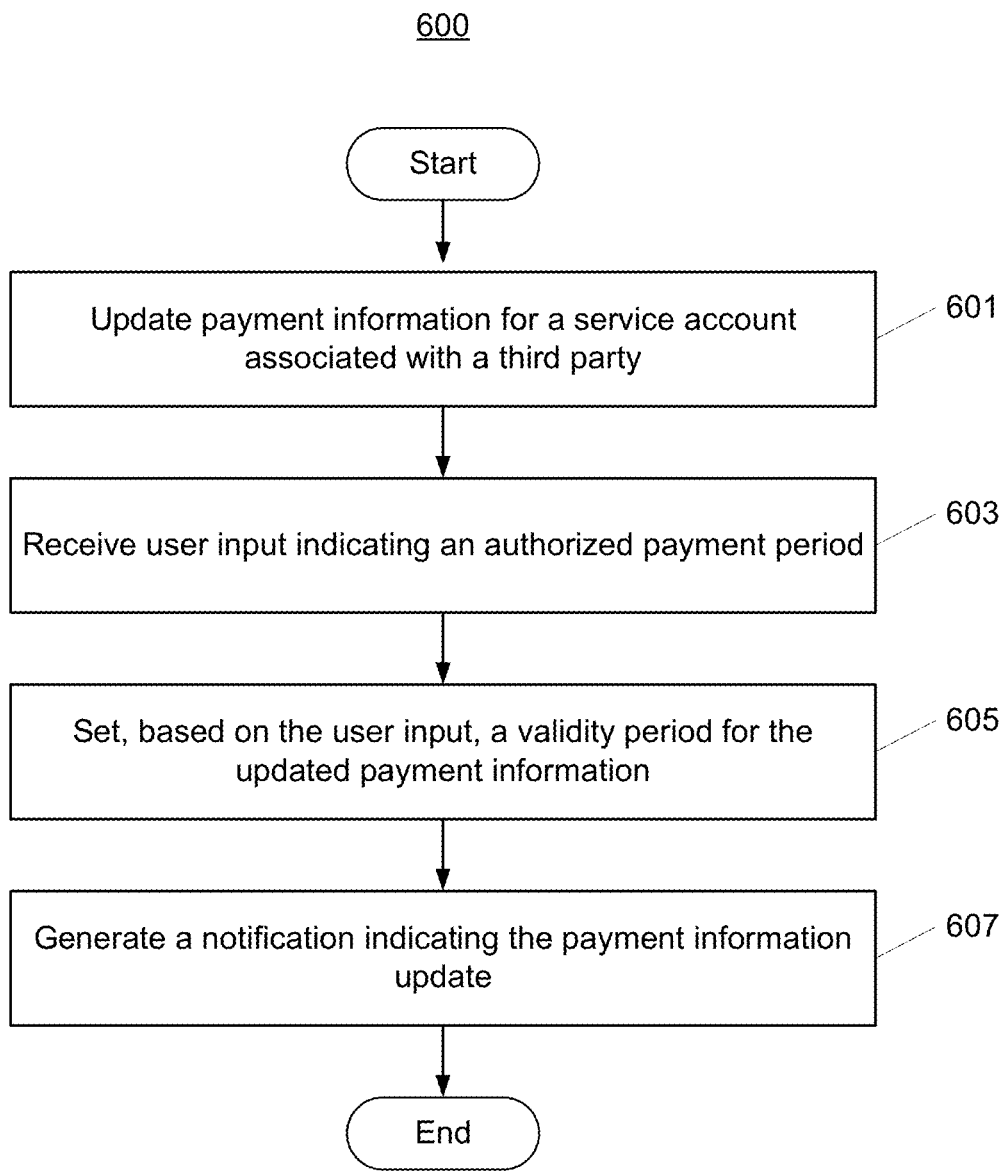
FIG. 6 is a flow chart of another exemplary process for processing financial transactions, consistent with the disclosed embodiments.

FIG. 6 is a flow chart of an exemplary process 600 for processing financial transactions, consistent with the disclosed embodiments. For ease of description, descriptions of process 600 refer to components described above in system 100 of FIG. 1. As shown in FIG. 6, process 600 includes steps 601-609. In some embodiments, procedures 601-609 can be incorporated into the processing described above with reference to FIG. 5, for example, as sub-procedures of step 513.

In step 601, based on the received transaction authorization (such as in step 511), dispute resolution server 140 can process an expected transaction by updating payment information for a service account associated with a third party. For example, dispute resolution server 140 can replace the comprised account number with the newly issued replacement account number, so the expected transaction can go through with the replacement account number.

Figure 16:
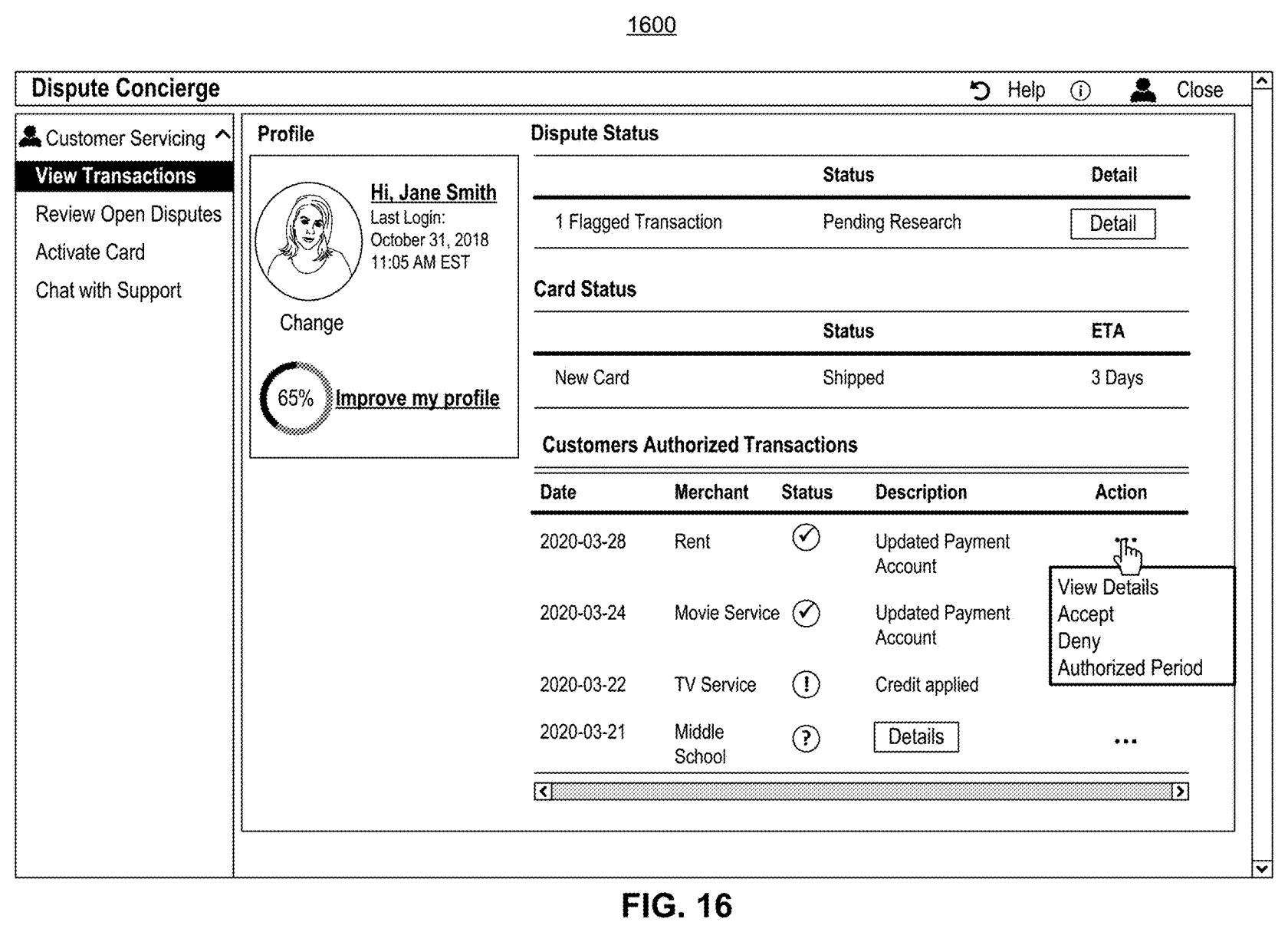

In step 603, dispute resolution server 140 receives user input indicating an authorized payment period. The user input can be a signal received from user device 160 based on user operation. The authorized payment period can correspond to a time window during which the user authorizes recurring transactions with the third party. In some embodiments, the authorized payment period can be in the form of a set number of transactions authorized. The user input can further include an authorized payment amount for one or more authorized transactions, or confirmation of a payee account. For example, the user may authorize payment of recurring rent payments for the upcoming six months. The user can interact with a user interface associated with the financial service application, to select/input information for the authorized payment period. As shown in FIG. 16, user interface 1600 may include an action column corresponding to each authorized expected transaction, which allows the user to perform additional operations such as "view details," "accept" or "deny" update made by dispute resolution server 140, or set "an authorized period." The user may input information setting the authorized period to be a desired time window, so that only upcoming transactions within the authorized period can be processed.

In step 605, dispute resolution server 140 can set, based on the received user input, a validity period for the updated payment information. For example, the validity period can correspond to (or be shorter) than the authorized payment period. When the validity period ends, transactions with the third party can no longer be processed with the updated payment information. Unauthorized transactions beyond the authorized time window can therefore be avoided.

In step 607, dispute resolution server 140 generates a notification indicating the payment information update. For example, as shown in user interface 1300 in FIG. 13 (and similarly in FIGS. 14-16), dispute resolution server 140 can transmit information indicating the payment processing status for display on user interface 1300. In this example, the "description" section for expected transactions "Rent" and "Movie Service" indicate "updated payment account," indicating that the corresponding payment accounts have been updated. The "description" section can further include details on the update, such as date and time of the update, current payment account information, or third party information associated with the transaction.

In some embodiments, dispute resolution server 140 can be implemented as a functional module of a financial service application installed on a user device. For example, as shown in user interface 1700 in FIG. 17, a dispute resolution module ("Dispute Concierge") can be added to a user interface associated with the financial service application. The dispute resolution module can serve as an integrated platform for handling transaction disputes associated with the user account, such as allowing the user to initiate transaction disputes, submit dispute resolution related information or inquiry, check dispute investigation status, and the like. As shown in this example, the dispute resolution module can be added to the user's "My Favorites" to allow easy access. In some embodiments, status updates on the user's transaction dispute(s) can be indicated via visually distinct representation of the "Dispute Concierge" button, or a pop-up alert, such as the one in FIG. 17, "New Update On Your Recent Dispute." That way, the user can be alerted promptly and directed to the dispute resolution module to view details.

Solutions consistent with the disclosed embodiments can be implemented in various forms. In some embodiments, a non-transitory computer-readable medium may be provided that stores instructions for a processor for processing transactions disputes according to the processing described above with reference to FIGS. 4-6, consistent with embodiments in the present disclosure. For example, the instructions stored in the non-transitory computer-readable medium may be executed by the processor for performing process 500 or 600 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, with various modifications, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit of the present disclosure being indicated by the following claims and their full scope of equivalents.

What is claimed is:

1. A computer-implemented system comprising:
a non-transitory computer-readable medium configured to store instructions;
a database storing transaction history records associated with a plurality of user accounts; and
a dispute resolution server including at least one processor configured to execute the instructions to perform operations comprising:
configuring a graphical user interface (GUI) to be presented on a display of a user device associated with a user account, the GUI displaying a list of historical transactions and at least one activation button, wherein each activation button is associated with one historical transaction in the list;
receiving, based on a first user input at the user device through the at least one activation button, an instruction to dispute a transaction associated with the user account;
sending a notification to a transaction management server associated with the user account, the notification indicating a temporary suspension of the user account;

issuing, based on a transaction amount indicated in a record of the transaction, provisional credit to the user account for the transaction;

determining, using a trained machine learning algorithm capable of identifying a user spending pattern based on a transaction history associated with the user account stored in the database, a plurality of expected upcoming transactions associated with the user account, wherein the plurality of expected upcoming transactions includes at least one of:

an upcoming periodically recurring charge, a potential transaction associated with a transaction platform which appears in the transaction history records at least once within a set period of time, or a potential transaction associated with a third party which appears in the transaction history records at least once within the set period of time;

configuring the GUI to display a list of the determined plurality of expected upcoming transactions and at least one second activation button, wherein each second activation button is associated with one expected upcoming transaction;

receiving, based on a second user input at the user device through the at least one second activation button, a transaction authorization for at least one of the plurality of expected upcoming transactions;

processing, using underlying funds connected with the user account, payments for the at least one of the plurality of expected upcoming transactions by sending a processing instruction to the transaction management server; and generating an update notification for display on the user device, the update notification linking to an interface displaying a dispute processing status of the transaction.

2. The system according to claim 1, wherein the operations further comprise:

invalidating an existing account number associated with the user account;

assigning a replacement account number associated with the user account; and generating a notification indicating the replacement account number for display on the user device.

3. The system according to claim 2, wherein the operations further comprise:

determining, based on the transaction history associated with the user account, a plurality of scheduled payments associated with the existing account number;

configuring the GUI to display the determined plurality of scheduled payments on the user device; and based on user input received from the user device, canceling a first subset of the plurality of scheduled payments, and processing a second subset of the plurality of scheduled payments.

4. The system according to claim 1, wherein the operations further comprise:

sending a request to the user device, requesting user input regarding the transaction; and acquiring, from the user device, user input regarding at least one of: a disputed amount, a reason for dispute, or a service date.

5. The system according to claim 1, wherein, an amount of the provisional credit corresponds to a disputed amount.

6. The system according to claim 1, wherein the determining, using the trained machine learning algorithm capable of identifying the user spending pattern based on the transaction history associated with the user account stored in the database, the plurality of expected upcoming transactions associated with the user account comprises:

determining, using the trained machine learning algorithm, an upcoming transaction associated with the third party based on the transaction history, wherein the transaction history includes historical payments associated with the third party; and configuring the GUI to display the determined upcoming transaction on the user device.

7. The system according to claim 6, wherein, the historical payments associated with the third party include periodically recurring payments within a preset time window.

8. The system according to claim 6, wherein, a number of occurrences of the historical payments associated with the third party exceeds a preset threshold.

9. The system according to claim 6, wherein the sending the processing instruction to the transaction management server comprises at least one of:

sending, to the transaction management server, an instruction for updating payment information for a service account associated with the third party; or sending, to the transaction management server, an instruction for acquiring, based on the transaction history, contact information of the third party for display on the user device.

10. The system according to claim 9, wherein the updating payment information for the service account associated with the third party comprises:

replacing an existing account number associated with the service account with a replacement account number assigned for the user account.

11. The system according to claim 9, wherein the operations further comprise:

setting a validity period associated with the updated payment information for the service account.

12. The system according to claim 1, wherein the generating the update notification for display on the user device comprises at least one of:

generating a notification indicating that the provisional credit is confirmed; or generating a notification indicating that the provisional credit is reversed.

13. The system according to claim 1, wherein, the update notification is transmitted to the user device using at least one communication channel based on user selection.

14. The system according to claim 1, wherein the sending the processing instruction to the transaction management server comprises replacing an existing account number associated with the user account with a replacement account number assigned for the user account.

15. A computer-implemented method, comprising:

configuring a graphical user interface (GUI), by a dispute resolution server, to be presented on a display of a user device associated with a user account, the GUI displaying a list of historical transactions and at least one activation button, wherein each activation button is associated with one historical transaction in the list;

receiving, by the dispute resolution server, an instruction to dispute a transaction associated with the user account, the instruction based on a first user input at the user device through the at least one activation button;

sending a notification from the dispute resolution server to a transaction management server associated with the user account, the notification indicating a temporary suspension of the user account;

issuing, by the dispute resolution server, provisional credit to the user account for the transaction, the provisional credit based on a transaction amount indicated in a record of the transaction;

determining, by the dispute resolution server and using a trained machine learning algorithm capable of identifying a user spending pattern based on a transaction history associated with the user account stored in the database, a plurality of expected upcoming transactions associated with the user account, wherein the plurality of expected upcoming transactions includes at least one of:
- an upcoming periodically recurring charge,
- a potential transaction associated with a transaction platform which appears in the transaction history records at least once within a set period of time, or
- a potential transaction associated with a third party which appears in the transaction history records at least once within the set period of time;

configuring the GUI by the dispute resolution server to display a list of the determined plurality of expected upcoming transactions and at least one second activation button, wherein each second activation button is associated with one expected upcoming transaction;

receiving, by the dispute resolution server, a transaction authorization for at least one of the plurality of expected upcoming transactions, the transaction authorization based on a second user input from the user device through the at least one second activation button;

processing, by the dispute resolution server, payments for the at least one of the plurality of expected upcoming transactions, using underlying funds connected with the user account, by sending a processing instruction to the transaction management server; and generating, by the dispute resolution server, an update notification for display on the user device, the update notification linking to an interface displaying a dispute processing status of the transaction.

16. The method according to claim 15, further comprising:
invalidating, by the dispute resolution server, an existing account number associated with the user account;
assigning, by the dispute resolution server, a replacement account number associated with the user account; and
generating, by the dispute resolution server, a notification indicating the replacement account number for display on the user device.

17. The method according to claim 16, further comprising:
determining, by the dispute resolution server and based on the transaction history associated with the user account, a plurality of pending payments associated with the existing account number;
configuring the GUI, by the dispute resolution server, to display the determined plurality of pending payments on the user device; and
based on user input received from the user device;
  canceling, by the dispute resolution server, a first subset of the plurality of pending payments; and
  processing, by the dispute resolution server, a second subset of the plurality of pending payments.

18. The method according to claim 15, wherein the operations further comprise:
sending a request from the dispute resolution server to the user device, requesting user input regarding the transaction; and
acquiring, by the dispute resolution server from the user device, user input regarding at least one of: a disputed amount, a reason for dispute, or a service date.

19. The method according to claim 15, wherein,
an amount of the provisional credit corresponds to a disputed amount.

20. The method according to claim 15, wherein the determining, by the dispute resolution server and using the trained machine learning algorithm capable of identifying the user spending pattern based on the transaction history associated with the user account stored in the database, the plurality of expected upcoming transactions associated with the user account comprises:
determining, by the dispute resolution server and using the trained machine learning algorithm, an upcoming transaction associated with the third party based on the transaction history, wherein the transaction history includes historical payments associated with the third party; and
configuring the GUI, by the dispute resolution server, to display the determined upcoming transaction on the user device.

21. The method according to claim 20, wherein,
the historical payments associated with the third party include periodically recurring payments within a preset time window.

22. The method according to claim 15, wherein the sending the processing instruction to the transaction management server comprises replacing, by the dispute resolution server, an existing account number associated with the user account with a replacement account number assigned for the user account.

* * * * *